(12) United States Patent
Damron et al.

(10) Patent No.: US 7,921,407 B2
(45) Date of Patent: Apr. 5, 2011

(54) SYSTEM AND METHOD FOR SUPPORTING MULTIPLE ALTERNATIVE METHODS FOR EXECUTING TRANSACTIONS

(75) Inventors: Peter C. Damron, Fremont, CA (US); Yosef Lev, Cambridge, MA (US); Mark S. Moir, Hampton, NH (US)

(73) Assignee: Oracle America, Inc., Redwood City, CA (US)

( * ) Notice: Subject to any disclaimer, the term of this patent is extended or adjusted under 35 U.S.C. 154(b) by 1186 days.

(21) Appl. No.: 11/591,919

(22) Filed: Nov. 2, 2006

(65) Prior Publication Data

US 2007/0055960 A1 Mar. 8, 2007

Related U.S. Application Data

(63) Continuation-in-part of application No. 10/915,502, filed on Aug. 10, 2004, now Pat. No. 7,395,382.

(51) Int. Cl.
*G06F 9/44* (2006.01)
*G06F 9/45* (2006.01)
*G06F 12/00* (2006.01)

(52) U.S. Cl. .................. 717/106; 717/151; 711/130

(58) Field of Classification Search .................. 717/130, 717/131, 106
See application file for complete search history.

(56) References Cited

U.S. PATENT DOCUMENTS

| | | | |
|---|---|---|---|
| 5,428,761 A * | 6/1995 | Herlihy et al. | 711/130 |
| 6,816,860 B2 * | 11/2004 | Yamamoto | 1/1 |
| 6,826,757 B2 | 11/2004 | Steele | |
| 6,880,045 B2 | 4/2005 | Pong | |
| 6,938,130 B2 | 8/2005 | Jacobson | |
| 7,089,374 B2 | 8/2006 | Tremblay | |
| 2003/0126383 A1 | 7/2003 | Cho | |
| 2004/0006671 A1 | 1/2004 | Handgen | |
| 2004/0015642 A1 * | 1/2004 | Moir et al. | 711/1 |
| 2005/0055675 A1 * | 3/2005 | Neifert et al. | 717/135 |
| 2005/0060559 A1 * | 3/2005 | McKenney | 713/190 |
| 2005/0138304 A1 | 6/2005 | Ramakrishnan | |
| 2006/0085591 A1 * | 4/2006 | Kumar et al. | 711/113 |

OTHER PUBLICATIONS

Kumar, et al., "Hybrid Transactional Memory", Mar. 29, 2006, Proceedings of the eleventh ACM SIGPLAN symposium on Principles and practice of parallel programming, p. 209-220.*

* cited by examiner

*Primary Examiner* — Wei Y Zhen
*Assistant Examiner* — Chung Cheng
(74) *Attorney, Agent, or Firm* — Robert C. Kowert; Meyertons, Hood, Kivlin, Kowert & Goetzel, P.C.

(57) ABSTRACT

Transaction code written by the programmer may be translated, replaced or transformed into a code that is configured to implement transactions according to any of various techniques. A compiler may replace programmer written transaction code into code allowing multiple compatible transaction implementation techniques to be used in the same program, and at the same time. A programmer may write transaction code once using familiar coding styles, but the transaction to be effected according to one of a number of compatible alternative implementation techniques. The compiler may enable the implementation of multiple, alternative transactional memory schemes. The particular technique implemented for each transaction may not be decided until runtime. At runtime, any of the various implemented techniques may be used to effect the transaction and if a first technique fails or is inappropriate for a particular transaction, one or more other techniques may be attempted.

16 Claims, 6 Drawing Sheets

FIG. 6

SYSTEM AND METHOD FOR SUPPORTING MULTIPLE ALTERNATIVE METHODS FOR EXECUTING TRANSACTIONS

CONTINUATION DATA

This application is a Continuation-In-Part of U.S. patent application Ser. No. 10/915,502 titled "Hybrid Software/Hardware Transactional Memory," filed Aug. 10, 2004, now U.S. Pat. No. 7,395,382 whose inventor was Mark S. Moir, and which is herein incorporated by reference in its entirety.

BACKGROUND OF THE INVENTION

1. Field of the Invention

This invention relates generally concurrent access to shared objects, and more particularly, to a system and method for implementing multiple, alternative techniques for concurrent access to shared objects.

2. Description of the Related Art

In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads.

Such assurances have often been provided by using locks to prevent other threads from accessing the data affected by an ongoing operation. Unfortunately, the use of locks may give rise to a number of problems, both in terms of software engineering and in terms of performance. First, the right "balance" of locking must be achieved, so that correctness can be maintained, without preventing access to an unnecessary amount of unrelated data (thereby possibly causing other threads to wait when they do not have to). Furthermore, if not used carefully, locks can result in deadlock, causing software to freeze up. Moreover, it is frequently the case that whenever a thread is delayed (e.g. preempted) while holding a lock, other threads must wait before being able to acquire that lock.

Transactional memory is a paradigm that allows the programmer to design code as if multiple locations can be accessed and/or modified in a single atomic step. As typically defined, a transactional memory interface allows a programmer to designate certain sequences of operations as "transactions", which are guaranteed by the transactional memory implementation to either take effect atomically and in their entirety (in which case we say succeed), or have no externally visible effect (in which case we say that they fail). Thus, in many cases, it is possible to complete multiple operations with no possibility of another thread observing partial results, even without holding any locks. The transactional paradigm can significantly simplify the design of concurrent programs.

Transactional memory is widely recognized as a promising paradigm for allowing a programmer to make updates to multiple locations in a manner that is apparently atomic, while addressing many of the problems associated with the use of locks. In general, transactional memory can be implemented in hardware, with the hardware directly ensuring that a transaction is atomic, or in software that provides the "illusion" that the transaction is atomic, even though in fact it is executed in smaller atomic steps by the underlying hardware.

Traditionally, systems implement or support only a single type of transactional memory implementation. Moreover, a programmer generally must know about, and write code to support, the particular interfaces for implementing transactional memory. Furthermore, even if a system supports a particular transactional memory implementation that implementation may not be guaranteed for all transactions. For example, a system may support a "best-effort" transaction memory implementation, but since the implementation is "best-effort" not all transactions may be guaranteed to be supported. Thus, a programmer may wish to include functionality to fall back to more flexible, if slower, transactional memory implementation that may guarantee support for all transactions. In order to do so, the programmer may have to specifically write code to support both the faster "best-effort" implementation and the slower fallback implementation at every location in the application for which the programmer wishes to execute instructions atomically.

SUMMARY

Transactional memory (TM) may support code sections that are to be executed atomically, i.e., so that they appear to be executed one at a time, with no interleaving between the steps of one transaction and another. This may allow programmers to write code that accesses and/or modifies multiple memory locations in a single atomic step, significantly reducing the difficulty of writing correct concurrent programs.

In some embodiments, a compiler may be configured to construct code that allows multiple compatible transaction implementation techniques to be used in the same program, and at the same time. Thus, programmers may write transaction code once using familiar coding styles and constructs, but the transaction may be executed according to one of a number of compatible alternative implementation techniques. Programmers may not need to write multiple versions of their code in order to exploit alternative implementation approaches, or even be specifically aware of the particular transaction implementations implemented. Instead the transaction code written by the programmer may be translated, replaced or transformed into code that is configured to implement the transactions according to any of various techniques. In some embodiments, the particular technique implemented for each transaction may not be decided until runtime. The compiler may enable the implementation of multiple, alternative transactional memory schemes. At runtime, any of the various implemented techniques may be used to effect the transaction and if a first technique fails or is inappropriate for a particular transaction, one or more other techniques may be attempted. Additionally, the compiler may generate calls to a run-time support library to help implement one or more of the alternative versions of the transaction code, to help coordinate the alternative versions, and/or to make (or help make) decisions regarding which code path (e.g. alternative transaction technique) to execute.

The system may determine a particular implementation technique for a particular transaction attempt, possibly hiding all details, including the existence of such alternative techniques, from the programmer. For example, a compiler or other translation tool may produce multiple code paths for a particular block, section or region of source code in a high-level programming language (e.g., C++, Java) to be executed atomically using transactions. Each of the code paths may execute a different alternative implementation of the same transactions. The compiler may also generate additional code to coordinate decisions about which method to use under what circumstances.

Various factors may help determine which implementation method to use. For example, whether or not (and what kind of) hardware transaction support is available may determine whether or not a hardware transaction implementation is used for a particular transaction. Additionally whether or not different implementations can correctly execution concurrently may determine whether or not a particular implementation is used for a particular transaction. Information regarding what other transaction methods may be concurrently in use and which of those have succeeded or failed recently, as well as other dynamically determined information, may help determine which transaction method is used.

BRIEF DESCRIPTION OF THE DRAWINGS

FIG. 6 is a block diagram illustrating an exemplary computer system capable of implementing multiple, alternative methods for executing transactions according to one embodiment While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As described above, a compiler may construct code that allows multiple compatible transaction implementation techniques to be used in the same program, and at the same time. Thus, programmers may write transaction code once using familiar coding styles, but the transaction to be effected according to one of a number of compatible alternative implementation techniques. Programmers may not need to write multiple versions of their code in order to exploit alternative implementation approaches, or even be specifically aware of the particular transaction implementations implemented. Instead the transaction code written by the programmer is translated, replaced or transformed into a code that is configured to implement transactions according to any of various techniques. In some embodiments, the particular technique implemented for each transaction may not be decided until runtime. The compiler may enable the implementation of multiple, alternative transactional memory schemes. At runtime, any of the various implemented techniques may be used to effect the transaction and if a first technique fails or is inappropriate for a particular transaction, one or more other techniques may be attempted.

The system may determine a particular implementation technique for a particular transaction attempt, possibly hiding all details, including the existence of such alternative techniques, from the programmer. For example, for a particular block of source code to be executed atomically using transactions, a compiler or other translation tool may produce code paths for multiple alternative implementations of these transactions, as well as additional code to coordinate decisions about which method to use under what circumstances.

Various factors may help determine which implementation method to use. For example, whether or not (and what kind of) hardware transaction support is available may determine whether or not a hardware transaction implementation is used for a particular transaction. Additionally, whether or not different implementations can correctly execute concurrently may determine whether or not a particular implementation is used for a particular transaction. Information regarding what other transaction methods may be concurrently in use and which of those have succeeded or failed recently, as well as other dynamically determined information, may help determine which transaction method is used. The decision as to which transaction techniques to use for which transactions may be made at runtime. In one embodiment, a separate transaction support library may provide various functions for implementing decisions regarding transaction techniques.

Additionally, in some embodiments, details regarding the particular environment in which an application is executing may affect which implementations or transaction techniques may or may not be available or appropriate for use. For example, some transaction techniques may not be usable when an application is executed in debug mode or when a breakpoint has been set within the set of atomic instructions. In other embodiments, certain transaction techniques may not be usable when the application is executed under particular environments. For instance, not all transaction techniques may be supported by all versions of an operation system or virtual machine. Thus in some embodiments, compiler 120 may generate code configured to support various alternative transaction techniques and that may determine at runtime which of those techniques are supported or appropriate given the particular environment and execution mode of the application. Transaction support library 140 may also include functionality for determining whether or not particular transaction techniques are support, available or appropriate based on execution environment and/or execution mode.

Furthermore, a variety of techniques may be employed to control which transaction techniques may be executed together under what circumstances. For example, compile-time options, runtime detection of available hardware support, runtime decisions by supporting library routines, etc., may be taken into account when deciding which particular transaction technique to use.

In general, different sets of alternative code paths for implementing transactions may be available and compatible according to available hardware support, algorithmic techniques used in the alternative implementations, and runtime conditions, such as potential conflicts (or lack thereof) between them, or specific memory access patterns or other aspects of the particular transaction.

Suppose we have N alternative ways to implement a given transaction. Thus, for this transaction, the compiler can produce N alternative code paths for attempting the transaction one or more times. Each attempt or sequence of attempts may have a successful outcome or an unsuccessful outcome.

Figure 1A:
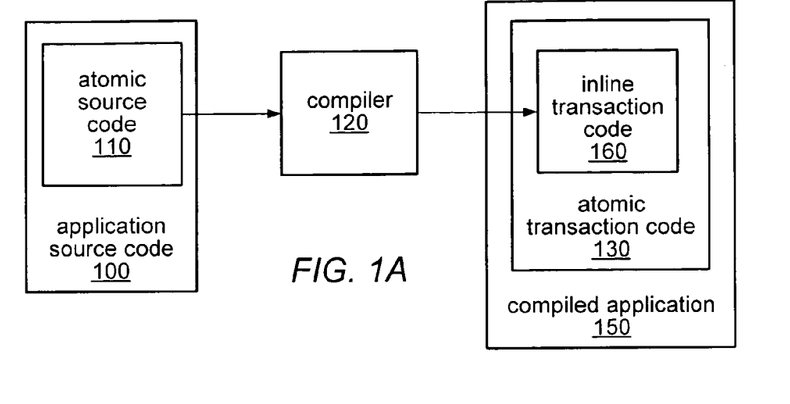
FIG. 1A is a block diagram illustrating a compiler generating inline transaction code, as described herein.

FIG. 1A is a block diagram illustrating a compiler 120 configured to analyze application source code 100, identify one or more sets of atomic source code 110 and then generate atomic transaction code 130 as part of compiled application 150, as described above.

As described above, a compiler, such as compiler 120 may be configured to replace programmer written code, such as in atomic source code 110, that is to be executed atomically with alternate code configured to implement multiple code paths, each implementing a particular transaction technique. For example, a programmer may write the source code for an application, such as application source code 100, using atomic blocks to specify sets instructions that should be executed atomically and/or as a transaction. For example, the program may include sets of instructions to be executed atomically together within a set of curly brackets (e.g., "{ }") preceded by the term "atomic", thus indicating that the instructions within the brackets should be executed atomically. As noted above, the programmer may not have any knowledge about what types of transaction techniques are available or supported on various computers systems on which the application may be executed.

Compiler 120 may, such as during the compilation of application source code 100, identify one or more sets of instructions to be executed atomically, such as by recognizing the atomic keyword, in one embodiment. In other embodiments, a programmer may use other or additional manners to indicate sets of instructions to be executed atomically. For instance, in one embodiment, a programmer may designate that certain methods and/or functions should be executed atomically, such as by using the atomic keyword (or some other language construct) in the method or function definition. In other embodiments operations to be executed atomically may be designated using pairs of keywords, such as "transactional_memory_section_begin" and "transactional_memory_section_end", to specify the beginning and end, respectively, of a group of operations. Thus, compiler 120 may be configured to identify sets of instructions or other fragments or portions of an application (e.g., functions, objects, method, classes, etc) by recognizing any of various language constructs that may be used to designate those instructions, fragments or portions to be executed atomically.

A programmer may also use a particular language construct, such as an atomic keyword, to designate specific data structures, classes and/or objects that should be accessed using transactions. Thus, in some embodiments, compiler 120 may be configured to recognize such atomic structures, class and/or objects and generate code to ensure that they are accessed using transactions.

Additionally, compiler 120 may, in one embodiment, be configured to generate code configured to determine at runtime whether or not a particular set of instructions should be executed using a transaction (e.g., atomically). For example, compiler 120 may generate code configured to test a certain condition at runtime to determine whether or not a particular set of instructions should be executed using a transaction.

While described herein mainly in terms of a compiler, compiler 120 may also represent other entities configured to generate atomic transaction code 130, according to different embodiments. For instance, in one embodiment, compiler 120 may represent a code optimizer rather than a compiler. In another embodiment, compiler 120 may represent a just-in-time (JIT) compiler rather than a more standard compiler. In some embodiments, compiler 120 may represent an assembler rather than a compiler. In general, compiler 120 may represent any entity capable of and configured to generate atomic transaction code for implementing multiple, alternative transaction methods, as described herein. While described herein as various software entities, compiler 120 may, in some embodiments, represent a hardware-based entity configured to generate atomic transaction code for implementing multiple, alternative transaction methods.

Atomic source code 110 may represent code instructions in any of various languages, according to various embodiments. For example, in some embodiments, atomic source code 110 may represent code written in a high level programming language, such as C, C++, or Java™. In other embodiments, atomic source code 110 may represent binary instructions or assembly instructions. In yet other embodiments, atomic source code 110 may also represent compiler-intermediate instructions, virtual machine byte code instructions, such as Java™ byte code instructions.

Atomic transaction code 130 may represent the code generated by compiler 120 and atomic transaction code 130 may include multiple code paths, each implementing one particular transaction technique or implementation. Atomic transaction code 130 may also include functionality to make various decisions regarding the execution of the different transaction techniques, such as which technique to use. Atomic transaction code 130 may also include functionality to maintain information regarding both current and past transactions to aid in making decisions regarding the execution of the different transaction techniques. Thus, as described herein, a programmer's source code indicating that certain instructions should be executed atomically may be translated, replaced or transformed into atomic transaction code 130 including, but not limited to, multiple code paths, decision making functionality regarding the multiple code paths, and functionality for maintaining information to support the decision making functionality.

In some embodiments, atomic transaction code 130 may be configured to include all the various code paths for implementing the different transaction techniques, as well as the decision-making functionality inline, such as in inline transaction code 160. In other embodiments, however, atomic transaction code 130 may be configured to utilize and/or include a library of transaction enabling code, such as transaction support library 140. Thus, in some embodiments, compiler 120 may be configured to generate inline transaction code 160 that includes all the various code paths and functionality to implement the different transaction techniques, as illustrated in FIG. 1A.

Figure 1B:
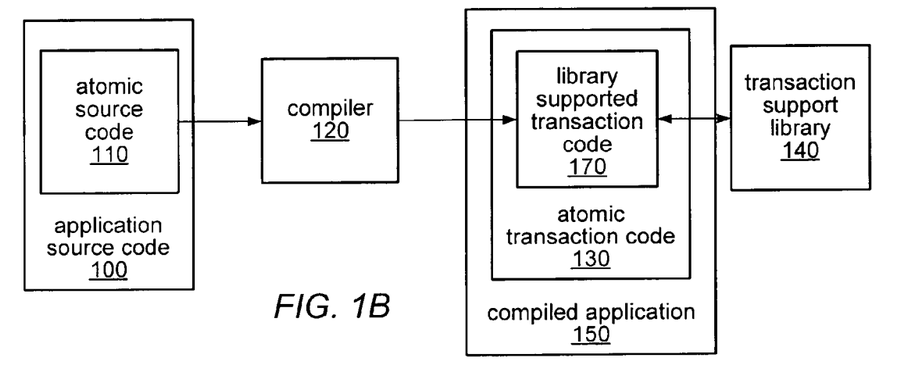
FIG. 1B is a block diagram illustrating a compiler generating library supported transaction code, as described herein.

In other embodiments, atomic transaction code 130 may be configured to call various functions provided by transaction support library 140, as illustrated in FIG. 1B. Transaction support library 140 may include the actual functionality to execute transactions according to the various transaction techniques. Additionally, transaction support library 140 may include functionality to make decisions regarding the various transaction techniques and about which technique to use for a particular transaction. Thus, in some embodiments, compiler 120 may be configured to generate atomic transaction code 130 to include library supported transaction code 170 configured to call functions provided by transaction support library 140 to determine which transaction technique to use and also call functions provided by transaction support library 140 to implement that transaction technique. In other words, atomic transaction code 130 may be configured to provide a frame-work for enabling transaction decisions and the implementation of transaction techniques by transaction support library 140.

Figure 1C:
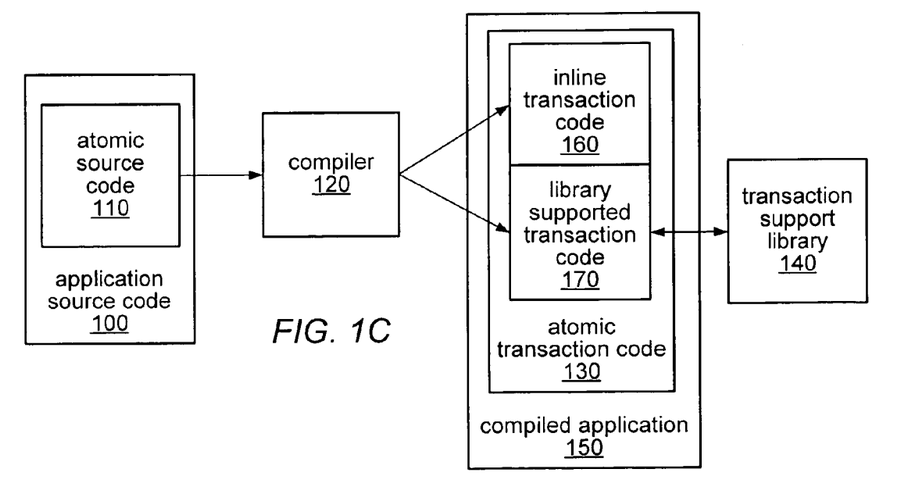
FIG. 1C is a block diagram illustrating a compiler generating both inline and library supported transaction code, as described herein.

In yet other embodiments, compiler 120 may be configured to generate both inline transaction code 160 and library supported transaction code 170 in atomic translation code 130, as illustrated by FIG. 1C. For example, inline transaction code 160 may be configured to implement certain transaction techniques, such as a default transaction technique, while library supported transaction code 170 may be configured to implement other transaction techniques. Additionally, when atomic transaction code 130 includes both inline transaction code 160 and library supported transaction code 170, different parts of transaction techniques may be performed by inline transaction code 160 or by library supported transaction code 170, according to various embodiments.

For example, in some embodiments, library supported transaction code 160 may be configured to call functions provided by transaction support library 140 to determine which transaction technique to use for a particular transaction, but inline transaction code 160 may include the functionality for implementing that transaction technique as one of the multiple code paths generated by compiler 120. For instance the following pseudo-code represents one possible embodiment of functionality included in atomic transaction code 130:

```
do
    // ask support library which code path to use
    i = whichCodePath (...) ;
    ...
    attempt to execute transaction using codepath i
    ...
until attempt succeeds
```

A wide variety of information may be used, either by inline transaction code 160 or a by transaction support library 140, to determine which transaction technique to use. For example, information regarding which transaction techniques are already being used for other, concurrent transactions, information regarding which of the various transaction techniques are compatible to be used concurrently, and information regarding the success or failure of previous uses of particular transaction techniques are examples of information that may be used, at least in part, to determine which particular transaction technique to use for a particular transaction. Additionally, inline transaction code 160 and/or transaction support library 140 maybe be configured to gather, record and/or maintain information regarding transaction attempts for use in subsequent decisions regarding which transaction technique to use.

Additionally, a function provided by transaction support library 140 to determine which transaction technique to use, such as the function whichCodePath() in the pseudo-code above, may also include parts of the implementation of particular transaction techniques. For example, in one embodiment, whichCodePath( ) may include functionality to begin the transaction using a selected transaction technique before returning an indication of the selected technique to atomic transaction code 130. Furthermore, the same function called by atomic transaction code 130 to determine which transaction technique to use may also include functionality to perform "contention control", such as by delaying the response to atomic transaction code 130 in order to reduce the number of concurrent transaction attempts. In other embodiments contention control may be performed in different manners, such as by waiting some period of time before aborting a transaction to see if a competing transaction may finish, or by waiting until some condition is true indicating that a competing transaction is finished. Thus, atomic transaction code 130 may be configured to determine whether or not a concurrent transaction (e.g., another transaction executing at the same time, such as in another thread), is attempting to modify or access a resource (e.g., memory location, data structure, object, etc) also being modified or accessed by another transaction.

As illustrated in the pseudo-code above, atomic transaction code 130 may, in some embodiments, be configured to attempt a particular transaction technique multiple times until the transaction succeeds.

Please note as described herein atomic transaction code 130 may include inline transaction code 160, library supported transaction code 170 or both, according to various embodiments. Thus, functionality described herein as being performed by atomic transaction code 160 may be performed by inline transaction code 160 in some embodiments and by library supported transaction code 170 in other embodiments.

For example, in some embodiments, inline transaction code 160 may include the functionality to begin and end transaction according to various transaction techniques. In other embodiments, however, library supported transaction code 170 may be configured to call one or more functions of transaction support library 140 to begin and end transactions.

Figure 2:
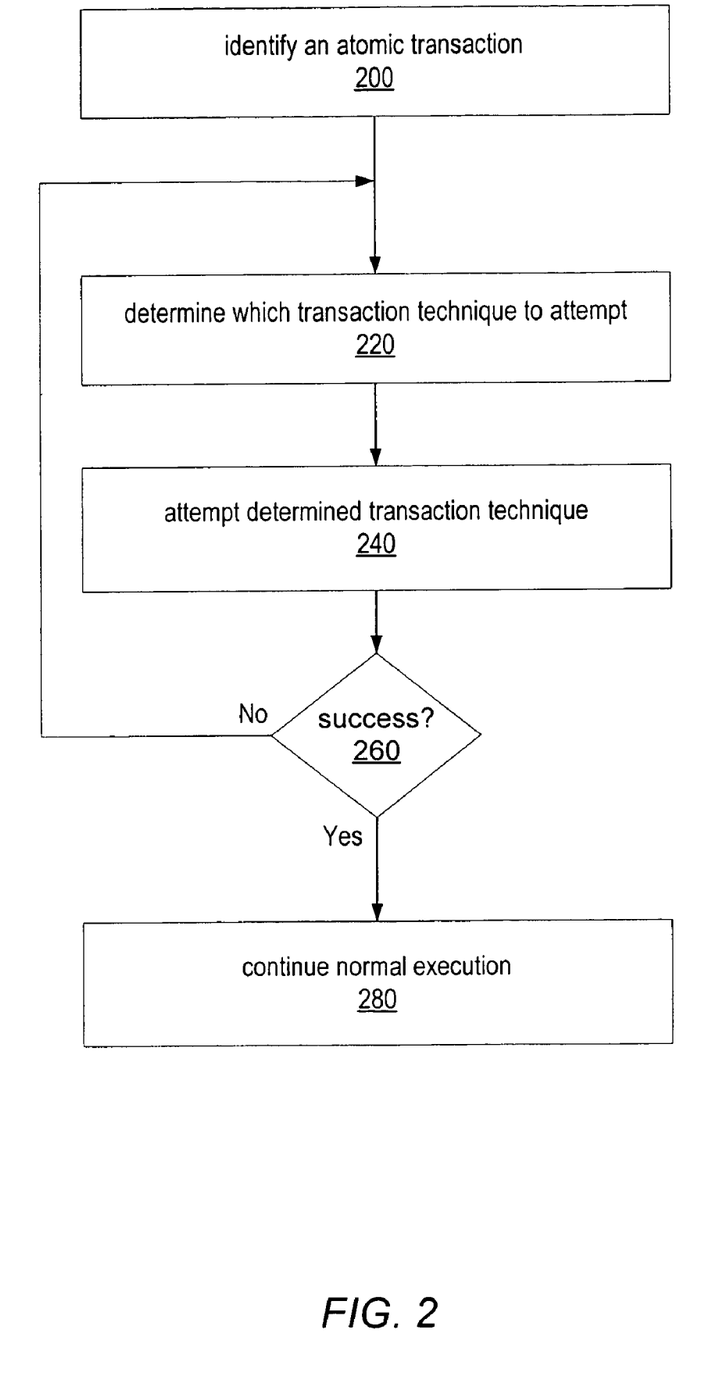
FIG. 2 is a flowchart illustrating one embodiment of a method for implementing multiple, alternative methods for executing transactions, as described herein.

FIG. 2 is a flowchart illustrating one embodiment of a method for implementing multiple, alternative transaction methods. As described above, a programmer may write code specifying that certain operations, functions, etc., should be executed atomically, as a transaction. Please note that in some embodiments, the operations may not actually be executed atomically, but may appear to be executed atomically to other processes or threads also executing the same system. When generating a compiled version of an application including the source code, a compiler, such as compiler 120 may analyze the programmer's source code and rather than directly compiling the transaction code written by the programmer, may generate code configured to implement multiple, alternative transaction methods. Subsequently, as runtime, one (or more) of the alternative transaction methods may be executed to implement the transaction specified by the programmer.

Thus, as illustrated in block 200, an atomic transaction may be identified. In some embodiments, compiler 120 may identify the atomic transaction as part of analyzing source code during the compilation process. For example, a programmer may have included code instructions within an atomic block—a language construct indicating that instructions within the atomic block should be executed atomically and/or as a transaction. Compiler 120 may then generate code configured to implement multiple alternative transaction methods for executing the instructions within the atomic block. Thus, compiler 120 may replace the atomic block with other instructions for executing transactions. For example, in one embodiment, compiler 120 may generate code configured to determine, at runtime, which of a plurality of transaction techniques to attempt, as illustrated by block 220.

When determining, at runtime, which transaction technique should be used for a particular transaction, various factors or types of information may be involved. For example, atomic transaction code 130 may be configured to determine whether or not the system on which the application is being executed includes hardware-based transactional memory. If so, atomic transaction code 130 may decide to attempt a hardware transaction at block 220. In other embodiments, atomic transaction code 130 may analyze information regarding previous transaction attempts when determining which transaction technique to use. For instance, if a particular transaction technique has failed or had to be aborted previously, atomic transaction code 130 may be configured to not select that particular transaction technique, according to one embodiment. Other types of information may also be used when determining which transaction technique to use, as will be described in more detail below.

After determining which transaction technique to use, atomic transaction code 130 may attempt to execute the atomic instructions using the determined transaction technique, as indicated by block 240. Attempting the determined transaction technique may involve beginning the transaction, performing one or more instructions to be executed atomically, such as I/O instructions, shared memory instructions, communication instructions, etc. In some embodiments, atomic transaction code 130 may also verify that no other code has performed any instructions that would prevent the transaction from being committed. For example, if the current transaction involves a modification of shared memory, atomic transaction code 130 may verify that no other code, such as may be executing in another thread, is also executing instructions to modify the same location in shared memory. If so, atomic transaction code 130 may abort the current transaction. If, as indicated by the negative output from decision block 260, the current transaction cannot or does not complete successfully, atomic transaction code 130 may be configured to attempt the same or another transaction technique again. If however, the current transaction is able to complete using the current transaction technique, as indicated by the positive output of decision block 260, atomic transaction code 130 may be configured to complete any processing regarding the current transaction, such as recording information regarding the success of the transaction, and then continue normal execution, as indicated by block 280.

Figure 3:
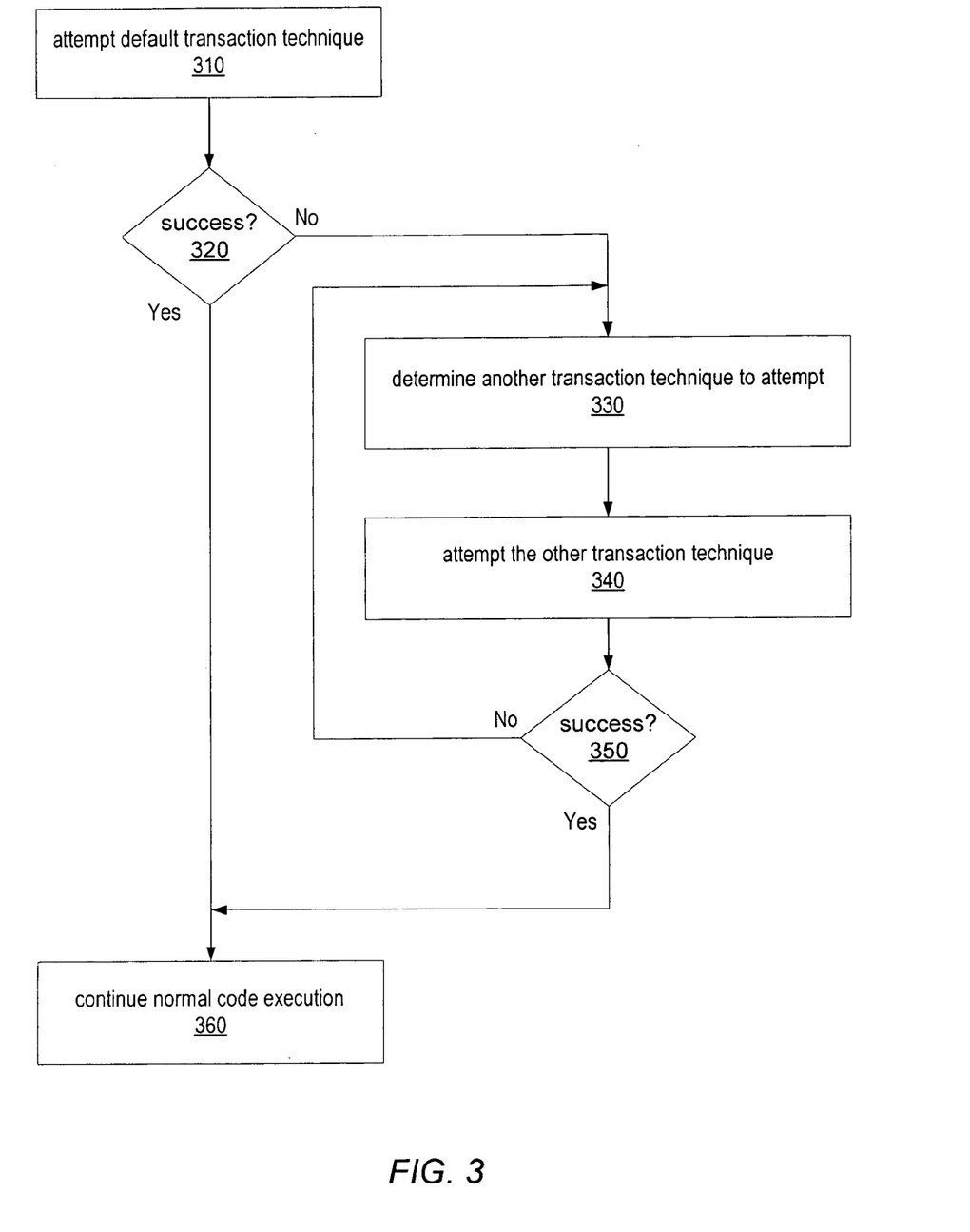
FIG. 3 is a flowchart illustrating one embodiment of a method for executing a transaction including a default transaction technique.

In another embodiment, atomic transaction code 130 may be configured to always attempt one transaction technique first. FIG. 3 is a flowchart illustrating one embodiment of a method for implementing multiple alternative transaction techniques including attempting a default technique first. For example, in one embodiment, compiler 120 may be configured to generate atomic transaction code 130 such that atomic transaction code 130 is configured to first attempt a default transaction technique, as indicated by block 310. For instance, in one embodiment, atomic transaction code 130 may be configured to always attempt a hardware transaction first. If the default transaction technique succeeds, as indicated by the positive output of block 320, atomic transaction code 130 may be configured to continue normal code execution, as indicated by block 360. If, however, the default transaction technique is not successful or must be aborted, atomic transaction code 130 may be configured to determine another transaction technique to attempt, as indicated by blocks 330 and 340. As described above regarding FIG. 2, atomic transaction code 130 may be configured to continue attempting the same or different transaction techniques until the transaction succeeds, as indicated by block 350.

In some embodiments however, before determining another transaction technique to attempt, atomic transaction code 130 may be configured to retry the default transaction technique one or more times. For example, atomic transaction code 130 may be configured to delay a certain amount of time and then retry the default transaction technique, before abandoning the default technique for another technique. In other embodiments, however, atomic transaction code 130 may be configured to only try the default technique once before moving onto another transaction technique. As described above, various factors may be involved in determine whether or not to try a default transaction technique and how many times the default transaction technique should be attempted. For instance, in some embodiments, compiler options set by the programmer or runtime options configured by a user (such as an administrator) may specify whether or not a particular technique, such as a hardware technique, should be used as a default technique and attempted first. Additionally, the programmer and/or user may be able to specify how many times a default technique should be attempted. In other embodiments, runtime factors, such as whether or not the default technique has been successful on previous transactions, or information regarding the particular type of transaction (e.g., I/O, shared memory, network communications, etc.), may be used to determine whether or not, and how many times, to attempt a default transaction technique.

Figure 4:
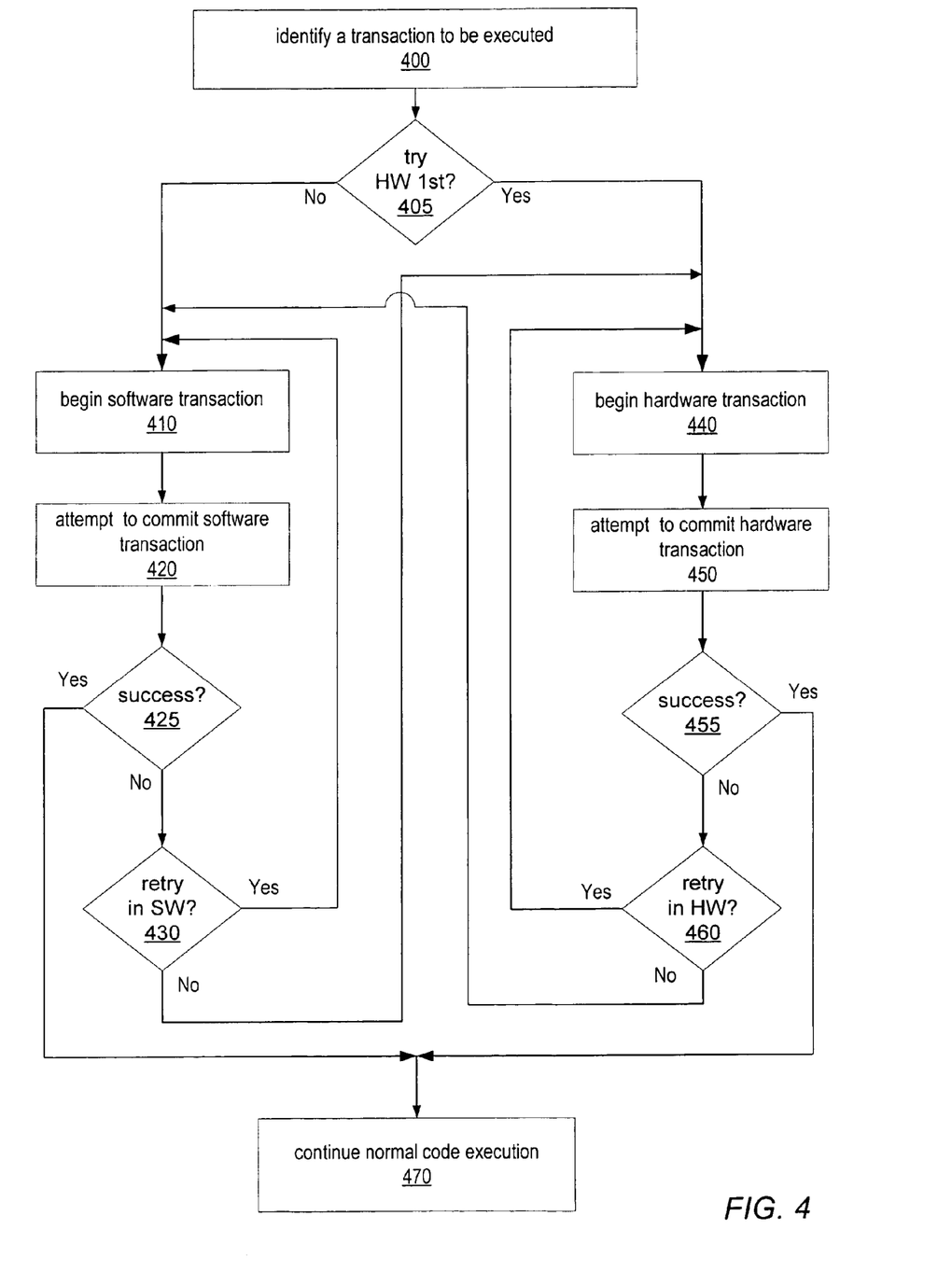
FIG. 4 is a flowchart illustrating one embodiment of a method for executing a transaction including both hardware and software transaction support.

In some embodiments, atomic transaction code 130 may be configured to attempt a hardware transaction technique first and if that fails to attempt a software transaction technique. For example, hardware transaction techniques may be much faster to execute than software transaction techniques. In other embodiments, however, the decision regarding whether or not to attempt a hardware transaction technique first may be made at runtime. FIG. 4 is a flowchart illustrating one embodiment of a method for executing a transaction including both hardware and software transaction support. After identifying that an atomic transaction to be executed, as illustrated by block 400, atomic transaction code 130 may be configured to determine whether or not to attempt a hardware transaction technique first, as indicated by decision block 405. As described above, various factors such as compiler options, runtime options, and information about the transaction, etc., may factor into the decision regarding what transaction technique to attempt first, according to various embodiments. Additionally, in some embodiments, the decision may be made inline by atomic transaction code 130 generated by compiler 120 while in other embodiments, atomic transaction code 130 may be configured to call a function from a support library, such as transaction support library 140 to determine whether or not to attempt a hardware transaction technique first.

If, as indicated by the positive output of block 405, atomic transaction code 130 determines to attempt a hardware transaction first, atomic transaction code 130 may begin the hardware transaction, as indicated by block 440. As noted above, in some embodiments, atomic transaction code 130 may be configured to call one or more functions provided by a support library, such as transaction support library 140, to begin a transaction technique. After executing the instructions of the transaction, atomic transaction code 130 may then attempt to commit the hardware transaction, as indicated by block 450. As with beginning the transaction, atomic transaction code 130 may be configured to call one or more functions provided by transaction support library 140 to commit the hardware transaction, according to some embodiments. In other embodiments, atomic transaction code 130 may include the code to commit the hardware transaction inline.

If the hardware transaction is successful, as indicated by the positive output of decision block 455, atomic transaction code 130 may then finish up any processing of the hardware transaction, such as recording the success of the transaction, and continue normal code execution, as indicated by block 470. If, however, the hardware transaction was not successful and fails or had to be aborted, as indicated by the negative output of block 455, atomic transaction code 130 may be configured to determine whether to retry the transaction using the hardware transaction technique again. If, as indicated by the positive output of decision block 460, atomic transaction code 130 determines to retry the transaction using the same technique, atomic transaction code 130 may be configured to retry the hardware transaction technique, as illustrated by blocks 440 and 450. In some embodiments, however, atomic transaction code 130 may retry a transaction by just attempting to re-commit the transaction without having to begin the entire transaction over again. If atomic transaction code 130 determines not to retry the transaction using the same technique, atomic transaction code 130 may be configured to begin a software transaction technique as illustrated by block 410.

If the attempt to commit the software transaction, as illustrated by block 420 is not successful, as indicated by negative output of block 425, atomic transaction code 130 may be configured to determine whether to retry the transaction again using the software transaction technique. If so, as indicated by the positive output of block 430, atomic transaction code 130 may again attempt the transaction using the software technique, as illustrated by blocks 410 and 420. In some embodiments, however, atomic transaction code 130 may retry a transaction by just attempting to re-commit the transaction without having to begin the entire transaction over again. If, however, atomic transaction code 130 determines not to retry the transaction using the software technique again, as indicated by the negative output of block 430, atomic transaction code 130 may be configured to again attempt the transaction using the hardware technique, as illustrated by block 440.

Thus, in some embodiments, atomic transaction code 130 may be configured to try a first transaction technique, such as a hardware transaction technique, one or more times and if that doesn't work, then try another transaction technique, such as a software transaction technique, one or more times. In other embodiments, atomic transaction code 130 may be configured to continue alternating between various techniques, possibly trying each technique multiple times, until the transaction completes successfully.

Please note that while described above regarding a hardware transaction technique and a software transaction technique, the method illustrated by FIG. 4, may be implemented regarding any two transaction techniques, whether hardware-based, software-based or both. For example, the method illustrated by FIG. 4 may be implemented regarding two software-based transaction techniques, in one embodiment. Additionally, in some embodiments, the method of FIG. 4 may be extended to work with more than two transaction techniques. For example, when one transaction technique fails, atomic transaction code 130 may be configured to determine a next transaction technique to try, as described above regarding the hardware and software transaction techniques.

The following sample code logically illustrates a schema for attempting various alternative implementations of transactional memory, according to one embodiment. As described above regarding FIG. 4, the schema below outlines a method in which first one technique is attempted one or more times and then another technique is attempted if the first technique fails.

```
B1:
    void *handle = NULL;
    hw_first = FirstTryInHW( ) ;
    < begin HW transaction code >
B2_hw_retry_loop:
    if (! hw_first) goto B6
```

```
B21:
    hw_first = 1;
    < transaction checkpoint with failure going to B5_hw_fail>
    {
        <modified HW code for transaction section >
        <note there may be conditional branches to B51_hw_sw_fail >
    }
    < for each section exit a B3 and B4 >
B3:
    < transaction commit with failure going to B5_hw_fail>
B4:
    goto B11_continue
B51_hw_sw_fail:
    < transaction fail >
B5_hw_fail :
    if (! HyTMCompilerIf_RetryInSoftware( handle)) {
        goto B2_hw_retry_loop;
    }
    < end HW transaction code >
B6:
    hw_first = 1;
    < save modified local variables >
B7_sw_retry_loop:
    Handle = HyTMCompilerIf_BeginTransaction( handle);
    {
        < modified SW code for transaction section >
        < note there may be conditional branches to B9 >
    }
    < for each section exit a B8 >
B8:
    If (HyTMCompilerIf_CommitTransaction( handle )) {
        goto B11_continue;
    }
    goto B9;
B9:
    < restore modified local variables >
    if (! HyTMCompilerIf_RetryInSoftware( handle )) {
        goto B2_hw_retry_loop;
    }
B10:
    Goto B7_sw_retry_loop;
B11_continue:
```

Figure 5:
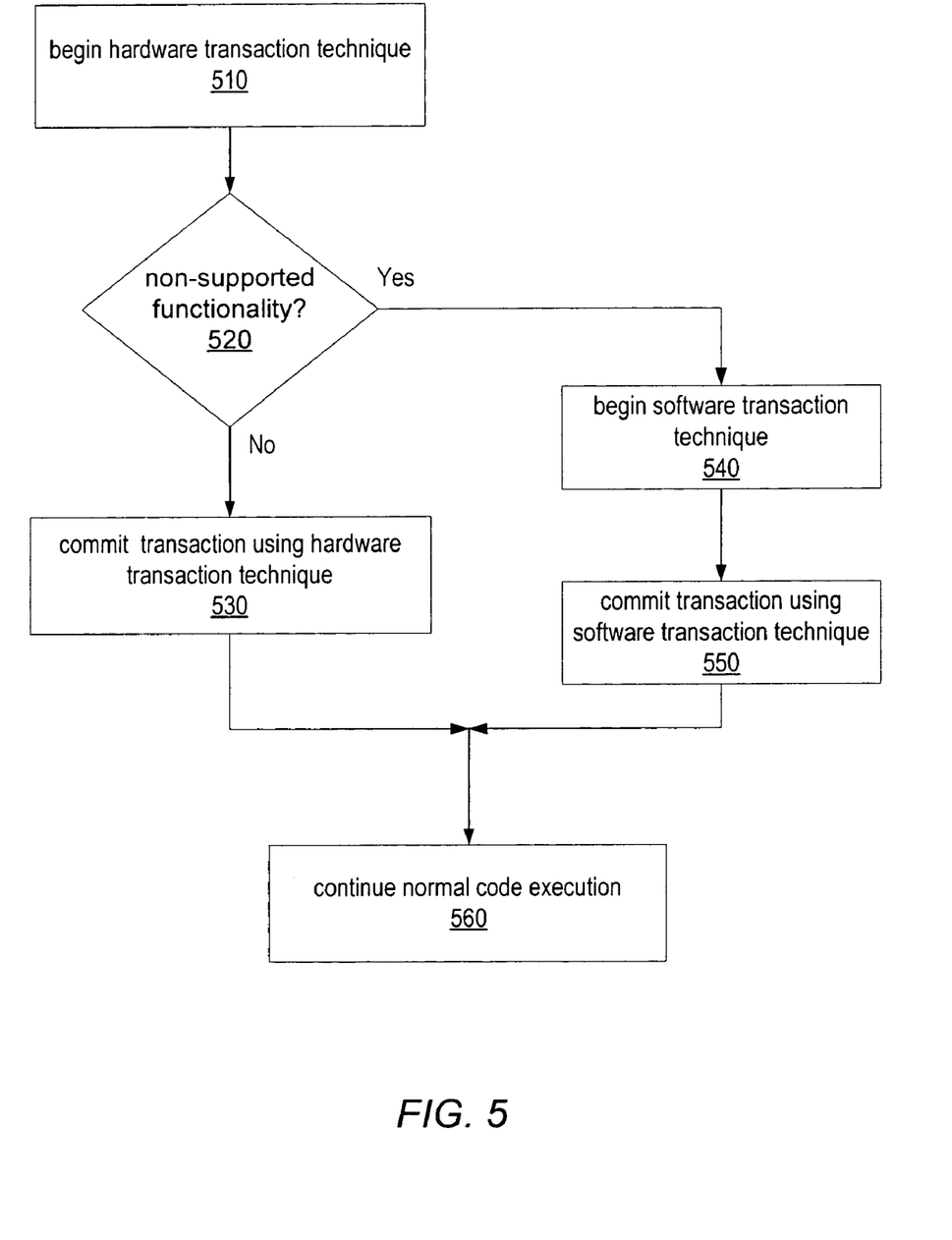
FIG. 5 is a flowchart illustrating one embodiment of a method for implementing different transaction methods based on application code.

In addition to trying different transaction techniques when one technique fails, atomic transaction code 130 may also be configured to switch transaction techniques before attempting to commit an already started transaction technique. For example, FIG. 5 is a flowchart illustrating one embodiment of a method for determining, at runtime, that a particular transaction is not suitable for a particular transaction technique and completing the transaction using another technique. For instance, in some embodiments, a hardware transaction technique may support particular I/O functionality as part of the transaction. In other embodiments, particular transaction techniques may not support particular functions or system calls, I/O calls, or certain memory access patterns. However, the application code that includes the non-supported instructions may not occur all the time. For example, within an atomic block, the non-supported code may only execute under certain conditions. In other words, the code in the atomic block may include one or more conditional branches only one of which may execute the non-supported code. Thus, in some embodiments, atomic transaction code 130 may be configured to start the transaction using a transaction technique that does not support the non-supported code, such as to use faster hardware transaction techniques for those cases in which the non-supported will not be executed, but to switch over and execute the transaction using another technique if the non-supported code is executed.

After beginning a transaction using a hardware transaction technique, as illustrated by block 510, atomic transaction code 130 may be configured to determine whether or not the transaction involves functionality not supported by the hardware transaction technique, as indicated by decision block 520. If, as indicated by the negative output of block 520, the transaction does not involve any non-supported functionality, atomic transaction code 130 may be configured to commit the transaction using the hardware transaction technique, as illustrated by block 530. If, however, the transaction does involve functionality not supported by the hardware transaction technique, as indicated by the positive output of block 520, atomic transaction code 130 may be configured to use a software transaction technique for executing the transaction as indicated by block 540 and 550. Additionally, atomic transaction code 130 may be configured to clean up or end the started hardware transaction technique before beginning the software transaction technique at block 540.

Please note, however, that in some embodiments, compiler 120 may be configured to determine whether or not a transaction, such as specified in an atomic block, involves code that is not supported by a particular transaction technique and to generate atomic transaction code 130 such that the particular transaction technique is not attempted.

Additionally, while described above regarding first beginning a hardware transaction technique and then switching to a software transaction technique, in general, the method described above regarding FIG. 5 may be applied to any two transactional techniques in which a transaction involves (or potentially involves) functionality or instructions not supported by one of the transaction techniques.

Figure 6:
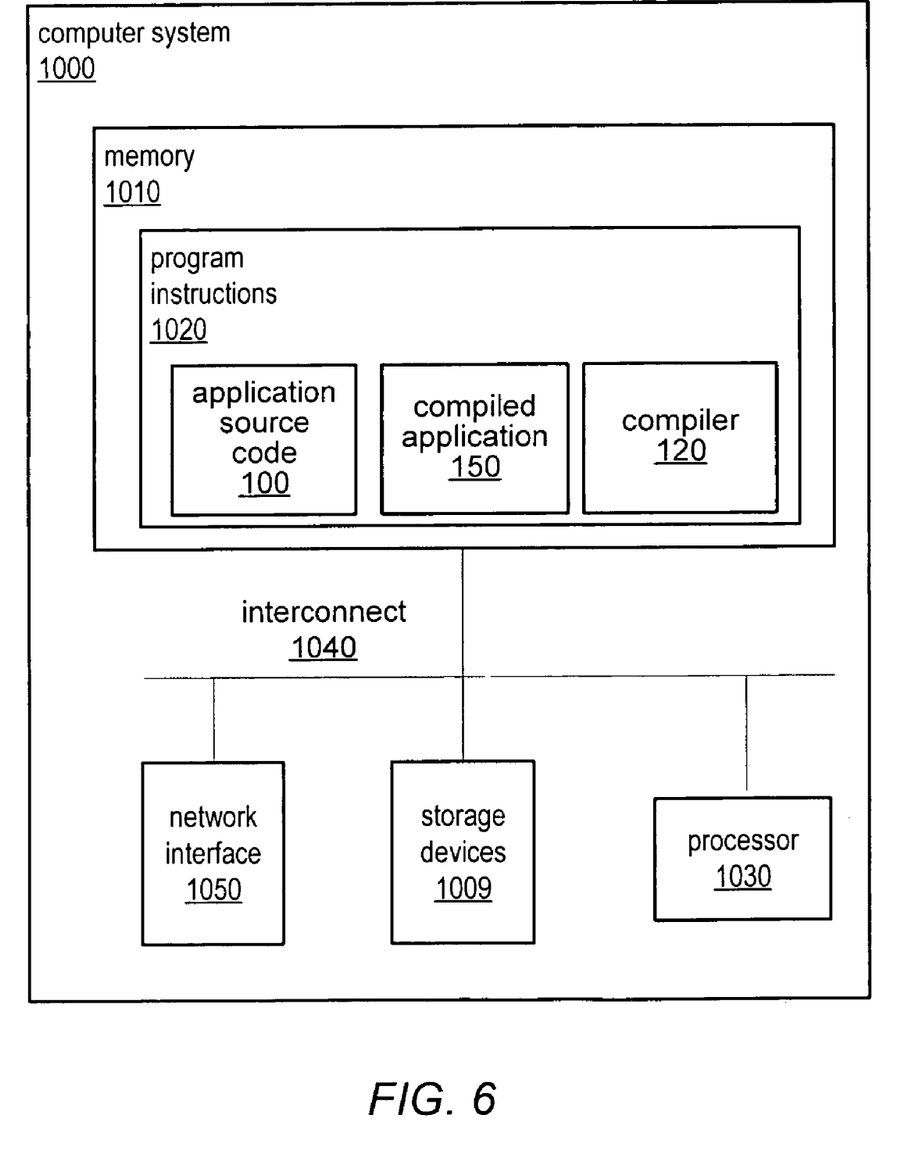

FIG. 6 illustrates a computing system capable of implementing compiler based support for multiple, alternative methods for implementing transactions, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single threaded processor, a multi-threaded processor, a multi-core processor, etc.). The computer system 1000 also includes one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and a storage device(s) (e.g., optical storage, magnetic storage, etc.). The memory medium may include other types of memory as well, or combinations thereof. Embodiments of the invention may include fewer or additional components not illustrated in FIG. 10 (e.g., video cards, audio cards, additional network interfaces, peripheral devices, etc.). The processor unit 1030, the storage device(s) 1009, the network interface 1050, and the system memory 1010 are coupled to the system interconnect 1040. One or more of the system memories 1010 may embody a compiler configured to provide multiple, alternative methods for implementing atomic transactions. Additionally, one or more of the system memories 1010 may embody an application including code specifying one or more atomic transactions.

In some embodiments, memory 1010 may include program instructions 1020 configured to implement a compiler, such as compiler 120, configured to provide multiple, alternative methods for implementing atomic transactions, as described herein. Additionally, program instructions 1020 may comprise application source code 100 including code configured to request or specify atomic transactions, as well as compiled application 150, as described herein. Furthermore, program instructions 1020 may be configured to implement a transaction support library 140, configured to provide multiple, alternative methods for implementing atomic transactions, as described herein. Compiler 120, application source code 100, compiled application 150, and/or transaction support library 140 may each be implemented in any of various programming languages or methods. For example, in one embodiment, compiler 120 and transaction support library 140 may be JAVA based, while in another embodiments, they may be written using the C or C++ programming languages. Similarly, application 110 may be Java, C, or C++, among other programming languages, according to various embodiments. Moreover, in some embodiments, compiler 120, transaction support library 140, and application 110 may not be implemented using the same programming language. For example, application 110 may be C++ based, while compiler 120 may be developed using C.

Additionally, processor 1030 may comprise hardware supported transactional memory functionality, such as described herein regarding transaction aware processor 150.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
performing by a computer:
analyzing source code comprising a plurality of instructions for an application;
identifying, based on said analyzing, a sequence of instructions in the source code that is configured to execute atomically;
replacing the identified sequence of instructions with an alternate sequence of instructions, wherein the alternate sequence of instructions is executable to implement:
determining, at runtime, one of a plurality of different transaction implementations for atomic execution of the identified sequence of instructions;
attempting to execute the determined one of the different transaction implementations to atomically execute the identified sequence of instructions;
determining, at runtime, that the determined one of the different transaction implementations failed; and
in response to said determining that the determined one of the different transaction implementations failed, determining another one of the different transaction implementations to execute;
wherein the analyzed source code does not include instructions to perform said determining one of a plurality of different transaction implementations.

2. The method of claim 1, further comprising, in response to said determining that the determined one of the different transaction implementations failed, and prior to said determining another one of the different transaction implementations to execute, retrying the determined one of the different transaction implementations.

3. The method of claim 1, wherein said determining one of a plurality of different transaction implementations comprises analyzing information regarding success or failure of previous attempts to atomically execute instructions according to one or more of the plurality of different transaction implementations.

4. The method of claim 1, wherein said determining one of a plurality of different transaction implementations comprises determining that one or more of the different transaction implementations are incompatible with one or more currently executing ones of the different transaction implementations.

5. The method of claim 1, wherein said determining one of a plurality of different transaction implementations is based, at least in part, on an operating system or virtual machine environment in which the alternate sequence of instructions is executing.

6. The method of claim 1, wherein said determining one of a plurality of different transaction implementations is based, at least in part, on whether or not the alternate sequence of instructions is executing in a debug mode.

7. The method of claim 1, further comprising:
determining that the identified sequence of instructions comprises one or more instructions that are not supported by a given one of the different transaction implementations;
wherein said determining one of a plurality of different transaction implementations comprises determining one of the different transaction implementations other than the given one of the different transaction implementations.

8. The method of claim 1, wherein at least one of the plurality of different transaction implementations comprises a hardware-based transaction implementation.

9. The method of claim 1, wherein the identified sequence of instructions comprises one of binary instructions, assembly instructions, and virtual machine byte code instructions.

10. The method of claim 1, wherein the identified sequence of instructions comprises one of load and store instructions, shared memory operations, network communication operations, and I/O operations.

11. The method of claim 1, wherein said analyzing, said identifying, and said replacing are performed by one of a compiler, a code optimizer, an assembler, a just-in-time (JIT) compiler, and a dynamic compiler.

12. The method of claim 1, further comprising determining that a separate attempt to execute one of the different transaction implementations conflicts with said attempting to execute the determined one of the different transaction implementations.

13. The method of claim 12, further comprising aborting execution of the determined one of the different transaction implementations.

14. The method of claim 12, further comprising delaying completion of the determined one of the different transaction implementations.

15. A system, comprising:
one or more processors; and
memory coupled to the one or more processors, wherein the memory comprises program instructions configured to implement a code translator;
wherein the code translator is configured to:
analyze source code comprising a plurality of instructions for an application;
identify, based on said analyzing, a sequence of instructions in the source code that is configured to execute atomically; and
replace the identified sequence of instructions with an alternate sequence of instructions, wherein the alternate sequence of instructions is executable to:
determine, at runtime, one of a plurality of different transaction implementations for atomic execution of the identified sequence of instructions;
attempt to execute the determined one of the different transaction implementations to atomically execute the identified sequence of instructions;
determine, at runtime, that the determined one of the different transaction implementations failed; and
in response to said determining that the determined one of the different transaction implementations failed, determine another one of the different transaction implementations to execute;
wherein the analyzed source code does not include instructions to perform said determining one of a plurality of different transaction implementations.

16. A non-transitory, computer-readable storage medium, storing program instructions that when executed on one or more computers cause the one or more computers to perform:
analyzing source code comprising a plurality of instructions for an application;

identifying, based on said analyzing, a sequence of instructions in the source code that is configured to execute atomically;
replacing the identified sequence of instructions with an alternate sequence of instructions, wherein the alternate sequence of instructions is executable to implement:
   determining, at runtime, one of a plurality of different transaction implementations for atomic execution of the identified sequence of instructions;
   attempting to execute the determined one of the different transaction implementations to atomically execute the identified sequence of instructions;
   determining, at runtime, that the determined one of the different transaction implementations failed; and
   in response to said determining that the determined one of the different transaction implementations failed, determining another one of the different transaction implementations to execute;
wherein the analyzed source code does not include instructions to perform said determining one of a plurality of different transaction implementations.

* * * * *